Figure 2:
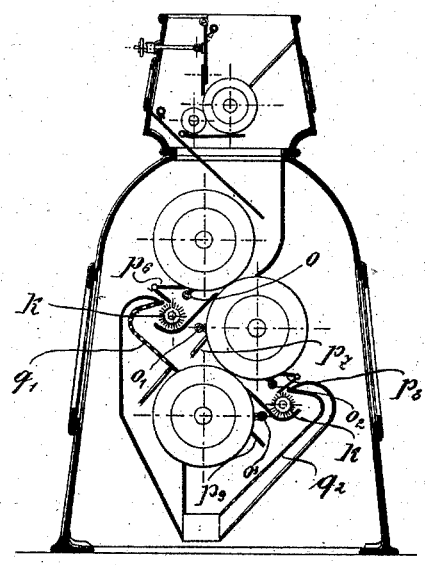

A. HANSEN.
PROCESS FOR WASHING AND STEEPING MALT AS WELL AS FOR GRINDING
WASHED AND STEEPED MALT.
APPLICATION FILED SEPT. 17, 1907.
966,910.
Patented Aug. 9, 1910.
2 SHEETS—SHEET 1.
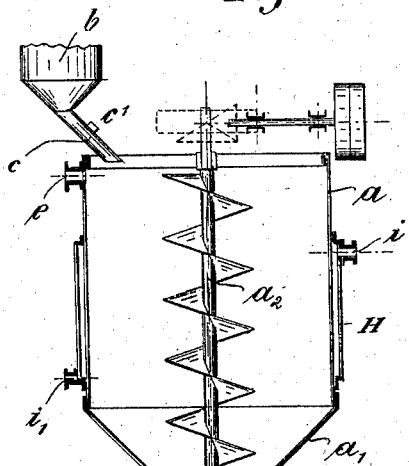
Fig. 1
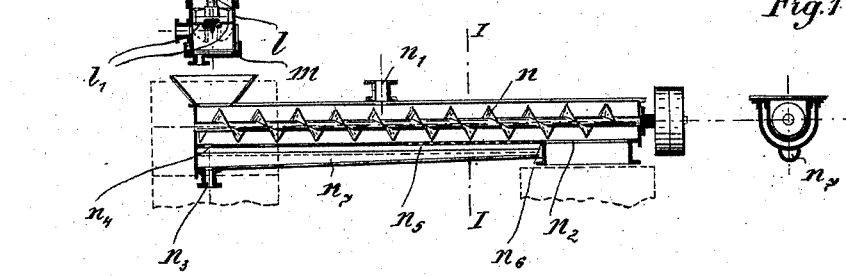
Fig. 1ᵃ
WITNESSES.
Alvin G. White
W. P. Burke
INVENTOR.
AUGUST HANSEN
BY Jm McLean White
ATTY A. HANSEN.
PROCESS FOR WASHING AND STEEPING MALT AS WELL AS FOR GRINDING WASHED AND STEEPED MALT.
APPLICATION FILED SEPT. 17, 1907.

966,910.

Patented Aug. 9, 1910.

2 SHEETS—SHEET 2.

WITNESSES.
Alvin J. White
W. P. Burk

INVENTOR
AUGUST HANSEN.

ATTY

UNITED STATES PATENT OFFICE.

AUGUST HANSEN, OF VIENNA, AUSTRIA-HUNGARY.

PROCESS FOR WASHING AND STEEPING MALT AS WELL AS FOR GRINDING WASHED AND STEEPED MALT.

966,910.     Specification of Letters Patent.    Patented Aug. 9, 1910.

Application filed September 17, 1907. Serial No. 393,402.

*To all whom it may concern:*

Be it known that I, AUGUST HANSEN, engineer, a subject of Germany, residing at Vienna, in the Empire of Austria-Hungary, have invented new and useful Improvements in a Process for Washing and Steeping Malt as well as for Grinding Washed and Steeped Malt, of which the following is a specification.

This invention relates to a process for washing and steeping malt as well as for grinding washed and steeped malt, and has for its object to remove from the malt the ingredients which very injuriously affect the taste of beer, by washing and steeping it before it is ground, as well as to subsequently grind the malt thus washed and steeped.

It is well known that malt, even after it has been purified by means of the most perfect mechanical apparatus, still contains, on the one hand, organic dust, and on the other hand micro-organisms in an enormous number, the said substances passing into the beer when the malt is used, and thus affecting in a very unfavorable manner the taste and the capacity of keeping of the said beer. The substances contained in the malt "spelt" which are not more fully known, are lixiviated during the brewing process and pass into the beer to which they communicate the well known highly unpleasant "spelt" taste to a greater or lesser extent. If, on the contrary, malt such as is used at present for grinding, even if it had been previously cleaned by means of the best mechanical purifying devices, is left in contact with cold or moderately warm water for a shorter or longer time, the said malt being kept moving if desired by means of a mechanical starting device for better attaining the purpose in question, it will be found that the said water contains a great portion of the dust which adhered to the malt, as well as a great portion of the spelt substance soluble in water. This "digestion" water is cloudy, has a sweet unpleasant smell and a very unpleasant sharp taste. It will thus be seen that it is of great importance first to free the malt by washing with cold or warm water from the substances which if not removed impart to the beer produced an unpleasant taste and smell.

The object of the process according to this invention which is as follows, is to attain the above result.

The malt to be brewed is introduced, after weighing or measuring, into a vessel of any desired shape which can be provided with a heating device and a mechanical stirring device, and according to the degree of impurity as well as according to the nature of the spelt is washed and steeped in either cold or warm water for a shorter or longer time with the assistance of a mechanical stirring device so that the malt is soaked only long enough to soften the hull but not the starch thereof, the water being supplied either intermittently or in a continuous manner. The malt purified and softened either passes direct into the wet grinding mill built for the purpose, or is again brought into contact with fresh water in currents flowing in opposite directions in the horizontal or obliquely rising transport conveyer, and if desired a quantity of moisture of the malt washed and steeped in accordance with the process described can be reduced to the degree desired in a moderately warm current of air centrifugally or in any other manner. The malt washed and steeped is crushed in the wet grinding mills with simultaneous admission of water in one or several sets of grinding rolls, the flour at the same time being separated from the husks and the latter only very little ground. From the mill the material, that is to say, the malt milk and the malt grist together with husks, passes either separately or together to the mashing.

For carrying out the above described new process for washing, purifying, and grinding malt, are preferably used the apparatus illustrated in the accompanying drawings.

Figure 3:
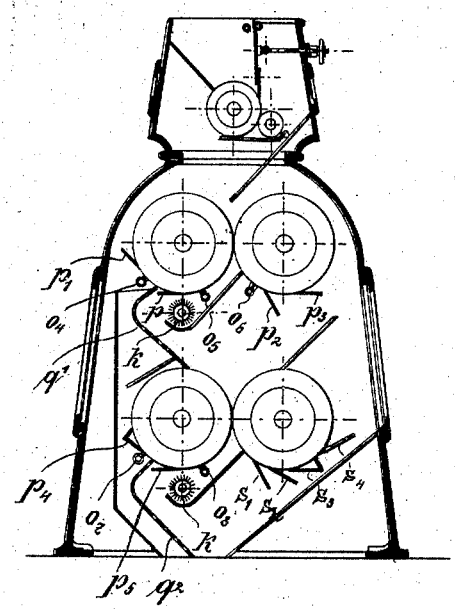

Figure 1 is a vertical section through the washing and purifying apparatus, as well as of the horizontal or oblique transport conveyer which may be used with the same. Fig. 1ª is a vertical section through the transport conveyer along the line I—I of Fig. 1. Fig. 2 is also a vertical section of a construction of the wet grinding mill with three rolls for grinding the malt washed and steeped as it comes from the apparatus shown in Fig. 1. Fig. 3 is another construction of the said grinding mill with four rolls.

The washing and purifying apparatus shown in Fig. 1 of the accompanying drawings consists of a cylindrical tank $a$ provided with a funnel shaped bottom $a'$ and containing a stirring gear $a^2$ having the shape of the transport conveyer or consisting of blades or stirring arms. The said stirring gear, the object of which is also to move the malt to be washed and purified from below upward in the tank $a$, can be driven either by means of a counter-shaft and bevel gear or, according to local circumstances, direct by half crossed belts. The malt coming from a measuring or weighing apparatus $b$ and intended for one brew, passes into the tank $a$ through the pipe $c$ after having previously passed through an air current at $c'$. The water used for moistening and washing the malt is admitted into the tank $a$ at the bottom at $d$ in order that the particles, impurities, etc., dissolved by water as well as separated owing to the washing and to the rubbing of the grains against each other, may be carried upward by the rising current of water and discharged at the top through the outlet $e$. By means of the stirring gear $a^2$ the malt can be caused to move whenever desired in a more or less strong manner according to the requirements. Around the tank $a$ is placed and connected to it a steam heater H into which steam required for heating the water introduced into the tank $a$, is admitted at $i$. There is provided a drain cock $i'$ for water of condensation. In the cylindrical outlet $l$ of the tank $a$ is arranged a divided intermediate bottom $l'$ which can be folded downward and which is made of perforated or slotted sheet metal, for the purpose of preventing the escape of any malt from the tank $a$ when water is being discharged. At the bottom end of the casing or cylinder $l$ is arranged a cover $m$ which is removed when the purifying and washing processes have been completed and the malt deprived of water, for the purpose of enabling the malt to pass to the grinding mill.

The transport conveyer $n$ which, according as required, may be arranged in the horizontal or in obliquely rising position is used as an additional washing apparatus, as well as for the horizontal transport of the malt coming out from the tank $a$.

The clean water introduced into the conveyer $n$ at $n'$ flows in the opposite direction through the malt driven toward the outlet $n^2$ and thus carries away through the outlet $n^3$ a further portion of the injurious substances dissolved in water and rubbed off. The conveyer portion from $n^4$ to $n^5$ is provided with an ordinary sheet metal bottom while the portion $n^5$ to $n^6$ has a bottom made of a slotted or perforated sheet metal for the purpose of letting through the water contained in the malt, which escapes through a trough $n^7$ arranged at the corresponding angle.

The wet grinding mill marked 2 in Figs. 2 and 3 can be made with 2, 3, 4 or more rolls, that is to say with 1, 2 or more passages for the material.

In order to insure uniform supply to the mills of the malt which in wet or moist state easily sticks and forms lumps, the feed device is provided with a shaking mechanism or several feed rolls and one stirring and shaking mechanism and if necessary also with a water supply.

For preventing the grinding mills from becoming dirty and sticky when grinding wet material, water is sprinkled on the circumference of the rolls through suitably shaped nozzles $o$, $o'$, $o^2$, whereby the material sticking to the rolls is softened and removed from the rolls by the stripping off scrapers $p'$ $p^2$ which follow. The material having passed through the first pair of rolls is projected against separators $q'$ made of slotted or perforated sheet metal, by means of the water escaping from the spraying devices $o'$ $o^2$, with any desired pressure, through separating devices $k$ which either consist of rolls with brushes or of a beating mechanism and which serve for again loosening the malt grains flattened between the rolls; the particles of flour and fine grist obtained during the first passage being separated and supplied direct to the outlet hopper. According to the requirements and for the sake of quicker conveyance of the grist over the separators $q'$, the latter can be given a vibrating movement by means of well known devices such as eccentrics, cams, etc. The material coming from the second pair of rolls is also loosened by the separating devices and can be passed over a separator or oblique bottom $q^2$ made of slotted or perforated sheet metal and, if desired, given a vibratory movement. With the assistance of the water supplied by the nozzles $o'$ $o^2$ . . . another and stronger separation of flour and fine particles of grist from the material takes place and then the particles of flour and grist separated during the first and second passage through the rolls, or malt milk alone, that is to say separated from the husks, can be discharged from the grinding mill.

Fig. 3 shows the device for keeping clean the grinding rolls consisting of a series of stripping-off knives $s'$ $s^2$ $s^3$, etc. These stripping-off devices are arranged in such manner that the first knife $s'$ is arranged at a certain distance from the circumference, and the edges of the following ones are arranged at an always decreasing distance from the circumference of the rolls while the last two stripping-off knives are in contact with their edges with the rolls and clean them completely.

The stripping-off devices $q$ $q'$ ... and $s$ $s'$ ... could be combined in a suitable manner.

I claim:

The herein described process of washing and steeping finished barley malt which consists in soaking the malt in water only long enough to soften the hull but not the starch thereof, in order to free the malt from impurities and also from the portion of the spelt substances which is soluble in water, removing the water containing the impurities and the substances soluble in water, and then grinding the malt.

In testimony whereof I have signed my name to this specification in the presence of two subscribing witnesses.

AUGUST HANSEN.

Witnesses:
JOHANN LUX,
ROBERT W. HEINGARTNER.